(12) United States Patent
Wang et al.

(10) Patent No.: US 10,769,528 B1
(45) Date of Patent: Sep. 8, 2020

(54) DEEP LEARNING MODEL TRAINING SYSTEM

(71) Applicant: SAS Institute Inc., Cary, NC (US)

(72) Inventors: Ben-hao Wang, Durham, NC (US); Joshua David Griffin, Harrisburg, NC (US); Seyedalireza Yektamaram, Amsterdam (NL); Yan Xu, Cary, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 16/590,544

(22) Filed: Oct. 2, 2019

Related U.S. Application Data

(60) Provisional application No. 62/858,528, filed on Jun. 7, 2019.

(51) Int. Cl.
  *G06N 3/08* (2006.01)
  *G06N 3/04* (2006.01)
(52) U.S. Cl.
  CPC .............. *G06N 3/08* (2013.01); *G06N 3/04* (2013.01)
(58) Field of Classification Search
  CPC .................................. G06N 3/08; G06N 3/04
  USPC .......................................................... 706/25
  See application file for complete search history.

(56) References Cited

PUBLICATIONS

Bollapragada et al ("A Progressive Batching L-BFGS Method for Machine Learning" May 2018) (Year: 2018).*

A. S. Berahas, et al, "A multi-batch L-BFGS method for machine learning," Advances in Neural Information Processing Systems, vol. 29, pp. 1055-1063, 2016.

L. Bottou, F. E. Curtis, and J. Nocedal. (2017) Optimization methods for large-scale machine learning. [Online]. Available: https://arxiv.org/pdf/1606.04838.pdf.

R. Johnson and T. Zhang, "Accelerating stochastic gradient descent using predictive variance reduction," in NIPS, 2013.

N. N. Schraudolph, J. Yu, and S. Gunter, "A stochastic quasi-newton method for online convex optimization," Proceedings of the 10th International Conference on Artificial Intelligence and Statistics, vol. 7, pp. 436-443, 2007.

P. Moritz, R. Nishihara, and M. I. Jordan, "A linearly-convergent stochastic L-BFGS algorithm," in AISTATS, 2016.

(Continued)

*Primary Examiner* — Lut Wong
(74) *Attorney, Agent, or Firm* — Bell & Manning, LLC

(57) ABSTRACT

A computer trains a neural network model. (B) A neural network is executed to compute a post-iteration gradient vector and a current iteration weight vector. (C) A search direction vector is computed using a Hessian approximation matrix and the post-iteration gradient vector. (D) A step size value is initialized. (E) An objective function value is computed that indicates an error measure of the executed neural network. (F) When the computed objective function value is greater than an upper bound value, the step size value is updated using a predefined backtracking factor value. The upper bound value is computed as a sliding average of a predefined upper bound updating interval value number of previous upper bound values. (G) (E) and (F) are repeated until the computed objective function value is not greater than the upper bound value. (H) An updated weight vector is computed to describe a trained neural network model.

30 Claims, 8 Drawing Sheets

(56) References Cited

PUBLICATIONS

R. Zhao, W. B. Haskell, and V. Y. F. Tan, "Stochastic L-BFGS revisited: Improved convergence rates and practical acceleration strategies," CoRR, vol. abs/1704.00116, 2017.

M. Mahsereci and P. Hennig, "Probabilistic line searches for stochastic optimization," Journal of Machine Learning Research, vol. 18, pp. 1-59, 2017.

SAS® Visual Data Mining and Machine Learning 8.4: Deep Learning Programming Guide, 2019, Chapters 2 and 3.

* cited by examiner

DEEP LEARNING MODEL TRAINING SYSTEM

CROSS-REFERENCE TO RELATED APPLICATIONS

The present application claims the benefit of and priority to 35 U.S.C. § 119(e) to U.S. Provisional Patent Application No. 62/858,528 filed Jun. 7, 2019, the entire contents of which are hereby incorporated by reference.

BACKGROUND

When training deep learning models, stochastic gradient descent (SGD) is the most widely used optimization method though it can be very sensitive to hyperparameter values and is not straightforward to parallelize. SGD variants, such as ADAM-SGD and Momentum-SGD, have been proposed to improve SGD performance. Though these variants can be more efficient and more robust, tuning their hyperparameters remains a daunting task. As a type of quasi-Newton method, the limited memory Broyden-Fletcher-Goldfarb-Shanno algorithm (L-BFGS) generally requires fewer iterations to converge, requires much less hyperparameter tuning, and is naturally parallelizable. Though there has been some progress recently in using stochastic L-BFGS for machine learning, stochastic L-BFGS overall is not as efficient as SGD for deep learning because it may become trapped in local minima, may require a long training time, and may produce large errors.

SUMMARY

In an example embodiment, a computer-readable medium is provided having stored thereon computer-readable instructions that when executed by a computing device, cause the computing device to train a neural network model. (A) a batch of observation vectors is selected. The batch of observation vectors includes a mini-batch size value number of observation vectors selected from a plurality of observation vectors. Each observation vector of the plurality of observation vectors includes a value for each variable of a plurality of variables. (B) A neural network is executed to compute a post-iteration gradient vector and a current iteration weight vector using the selected batch of observation vectors. The neural network includes a layer type for each layer of a plurality of neural network layers. (C) A search direction vector is computed using a Hessian approximation matrix and the post-iteration gradient vector. (D) A step size value is initialized with a predefined step size value. (E) An objective function value is computed that indicates an error measure of the executed neural network given the current iteration weight vector, the step size value, and the computed search direction vector. (F) When the computed objective function value is greater than an upper bound value, the step size value is updated using a predefined backtracking factor value. The upper bound value is computed as a sliding average of a predefined upper bound updating interval value number of previous upper bound values. (G) (E) and (F) are repeated until the computed objective function value is not greater than the upper bound value. (H) An updated weight vector is computed as a function of the current iteration weight vector, the updated step size value, and the computed search direction vector. (I) (A) to (H) are repeated until a convergence parameter value indicates training of the neural network is complete. The current iteration weight vector for a next iteration is the computed updated weight vector. The computed updated weight vector is output to describe a trained neural network model.

In another example embodiment, a computing device is provided. The computing device includes, but is not limited to, a processor and a computer-readable medium operably coupled to the processor. The computer-readable medium has instructions stored thereon that, when executed by the processor, cause the computing device to train a neural network model.

In yet another example embodiment, a method of training a neural network model is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

DETAILED DESCRIPTION

Figure 1:
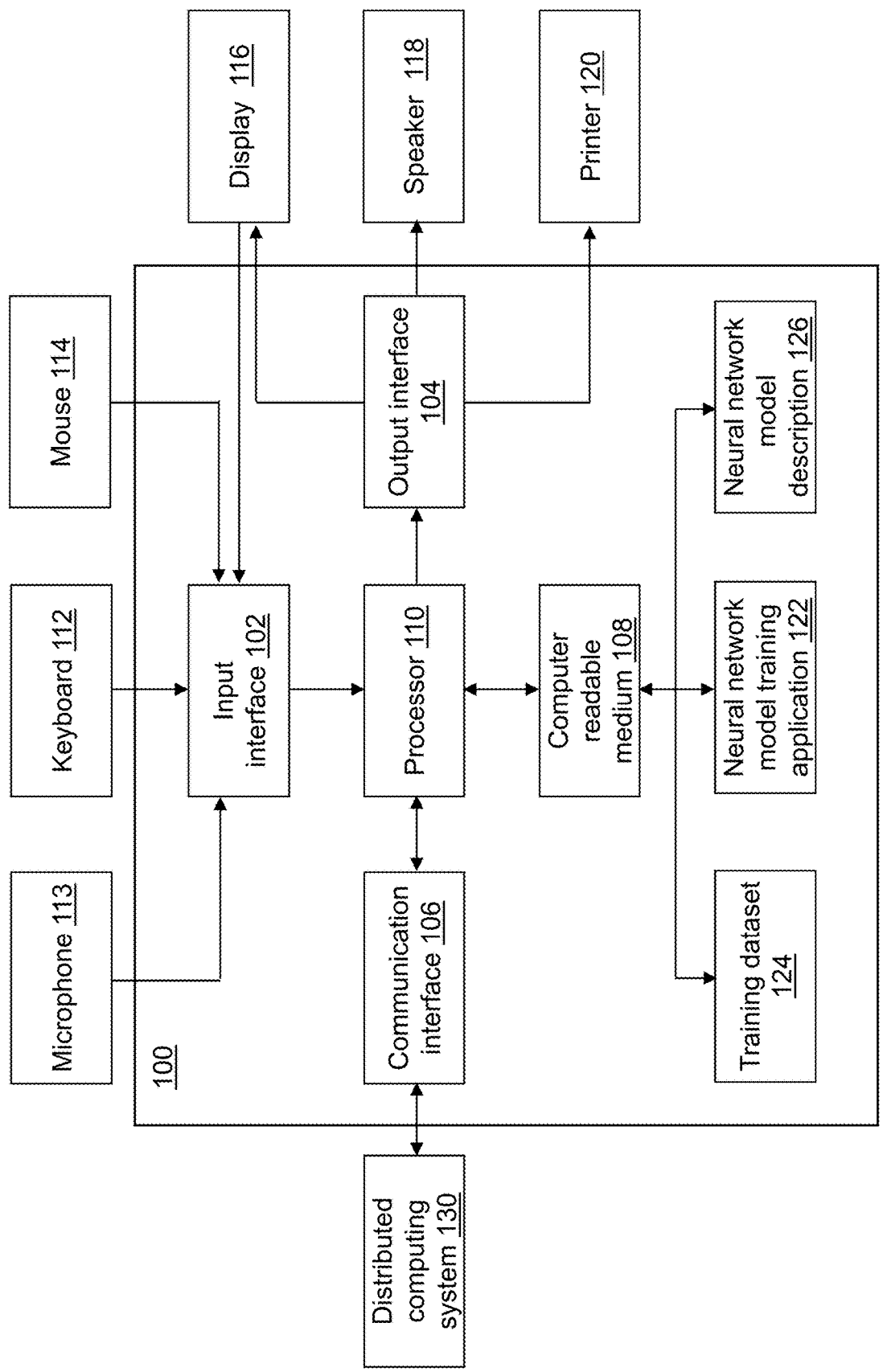
FIG. 1 depicts a block diagram of a neural network model training device in accordance with an illustrative embodiment.

Neural networks are a class of machine learning models that consist of one or more transformation layers. Loosely speaking, each layer inputs a set of weights denoted by the matrix $W \in \mathbb{R}^{h \times d}$, a set of neurons $x \in \mathbb{R}^d$, and a bias term $\beta \in \mathbb{R}_d$. The corresponding output of the layer is itself a set of neurons $a(x) \in \mathbb{R}_h$ defined by the transformation:

$$a(x) = \sigma(Wx + \beta),$$

where σ denotes the corresponding activation function. If there are l layers and the set of pairs (W, β) are indexed by their corresponding layer index, the union of the set of parameters $U\{W_i, \beta_i\}_{i=1}^{l}$ becomes the corresponding optimization variables or parameters. For simplicity, a map from this set to a weight vector $w \in \mathbb{R}^m$ is assumed, where m corresponds to a total number of variables across all layers. Henceforth, all notation is with respect to the weight vector w.

Deep learning models are a class of neural networks consisting of many layers. As in other machine learning approaches, in deep learning, a loss function is minimized $$\min_{w \in \mathbb{R}^m} F(w) = \frac{1}{N} \sum_{i=1}^{N} F_i(w),$$

where each $F_i(w)$ provides a measure of accuracy for the deep learning model applied to the $i^{th}$ observation in a training dataset which consists of N observations. Because |N| may be arbitrarily large in the world of big data, stochastic sampling methods are attractive. Instead of evaluating $F(w)$ each iteration, inexpensive approximations to $F(w)$ using small randomly sampled sets, $S \subset \{1, \ldots, N\}$ are incorporated, resulting in the sample (or mini-batch) approximation function $$F_S(w) = \frac{1}{|S|} \sum_{i=1}^{|S|} F_i(w).$$

The class of SGD methods that create a solution sequence $\{w_k\}$ using only stochastic first-order approximations defined simply as $w_{k+1}=w_k-\eta_k \nabla' F_s(w_k)$ are commonly used where $\eta_k$ is a control parameter call the learning rate. A number of subsequent more sophisticated variations in this family have been proposed in the context of deep learning to enhance convergence and distribution properties such as ADAM-SGD, Momentum-SGD, ADAGRAD, etc.

Regardless of the variation, it has been observed that well-tuned SGD methods are highly effective at training large deep learning models with huge input datasets across diverse applications including image classification, object detection, machine translation, etc. SGD uses the first derivative of the cost function to decide the search direction. The step size is generally determined by predefined learning rate policies. Since the computation requirement of SGD is low, SGD is able to scale to train large models. The simplicity and scalability of SGD come with a cost though. SGD often requires extensive hyperparameter tuning to be effective which increases the training time.

Because of this, quasi-Newton methods are attractive in that they build and exploit second-order information in the background using the same inputs as SGD and nominal additional computational logistics. By far the most popular existing quasi-Newton update strategy is the L-BFGS method. At each iteration, L-BFGS uses gradients to approximate an inverse Hessian matrix and to compute the search direction and step size. Compared to SGD, L-BFGS requires fewer iterations to converge and usually needs minimal hyperparameter tuning. However, L-BFGS is more expensive per iteration and tends to get trapped in local minima with inferior objective values.

Stochastic L-BFGS uses a mini-batch of input data to evaluate the objective function during each iteration. For classic stochastic L-BFGS, the gradient pairs used to update the Hessian approximation are from different mini-batches, thus the Hessian approximation can be inaccurate causing instability. To overcome this problem, one more evaluation at each mini-batch can be computed so that the gradient pairs are from the same mini-batches as described in N. N. Schraudolph et al., *A stochastic quasi-newton method for online convex optimization*, Proceedings of the 10th International Conference on Artificial Intelligence and Statistics, Vol. 7, 436-443 (2007). However, this approach doubles the computation cost of the Hessian approximation update. A batch overlap method as described in A. S. Berahas et al, *A multi-batch l-bfgs method for machine learning*, Advances in Neural Information Processing Systems, Vol. 29, 1055-1063 (2016) reduces the additional computation, but requires additional memory storage and computational logistics.

When training deep learning models, the solution process using linear search can become stuck in local minimal solutions that may be located far from a true optimal value. As a quasi-Newton method, L-BFGS employs a line search procedure to compute the step size at each iteration. Generally, the line search of L-BFGS employs either a backtracking line search or the Wolfe conditions to update the step size. A typical backtracking line search starts with a relatively large estimated step size to move along a search direction, and gradually backtracks the step size until the desired objective function value decrease is achieved. Because backtracking needs extra function evaluations, this procedure can become expensive when the objective function evaluation is not computationally cheap. Again, a strict linear search requirement can also cause L-BFGS to become trapped at a local minimum and terminate with a large training error.

Given a search direction $p_k$, standard line-search methods require that the corresponding step size $\alpha_k$ satisfy a sufficient-decrease condition, such as the Armijo-Goldstein condition that requires $$F(w_k+\alpha_k p_k) < F(w_k) + c\alpha_k p_k^T \nabla F(w_k)$$

where $w_k$ is a current weight vector and $c \in (0,1)$ is a control parameter. Such a condition ensures the reduction in $F(w_k)$ is proportional to that of the first-order Taylor expansion of $F(w_k)$ centered at $w_k$. Stochastic algorithms offer a new challenge to classical line-search methods because $F(w_k)$ is not fully evaluated and is instead approximated by a mini-batch sample function $$F_S(w_k) \approx F(w_k)$$

and further may be non-smooth due to discontinuous operations like batch normalization. Thus, classical sufficient decrease functions can result in very small steps, stalled progress, and a failed line search.

Referring to FIG. 1, a block diagram of a neural network model training device 100 is shown in accordance with an illustrative embodiment. Neural network model training device 100 may include an input interface 102, an output interface 104, a communication interface 106, a non-transitory computer-readable medium 108, a processor 110, a neural network model training application 122, training dataset 124, and a neural network model description 126. Neural network model training application 122 provides a stochastic L-BFGS algorithm that is significantly more stable and efficient than the existing stochastic L-BFGS algorithms described above. Fewer, different, and/or additional components may be incorporated into neural network model training device 100.

Input interface 102 provides an interface for receiving information from the user or another device for entry into neural network model training device 100 as understood by those skilled in the art. Input interface 102 may interface with various input technologies including, but not limited to, a keyboard 112, a microphone 113, a mouse 114, a display 116, a track ball, a keypad, one or more buttons, etc. to allow the user to enter information into neural network model training device 100 or to make selections presented in a user interface displayed on display 116.

The same interface may support both input interface 102 and output interface 104. For example, display 116 comprising a touch screen provides a mechanism for user input and for presentation of output to the user. Neural network model training device 100 may have one or more input interfaces that use the same or a different input interface technology. The input interface technology further may be accessible by neural network model training device 100 through communication interface 106.

Output interface 104 provides an interface for outputting information for review by a user of neural network model training device 100 and/or for use by another application or device. For example, output interface 104 may interface with various output technologies including, but not limited to, display 116, a speaker 118, a printer 120, etc. Neural network model training device 100 may have one or more output interfaces that use the same or a different output interface technology. The output interface technology further may be accessible by neural network model training device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. Neural network model training device 100 may have one or more communication interfaces that use the same or a different communication interface technology. For example, neural network model training device 100 may support communication using an Ethernet port, a Bluetooth antenna, a telephone jack, a USB port, etc. Data and/or messages may be transferred between neural network model training device 100 and another computing device of a distributed computing system 130 using communication interface 106.

Computer-readable medium 108 is an electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Neural network model training device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Neural network model training device 100 also may have one or more drives that support the loading of a memory media such as a CD, DVD, an external hard drive, etc. One or more external hard drives further may be connected to neural network model training device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Neural network model training device 100 may include a plurality of processors that use the same or a different processing technology.

Some machine-learning approaches may be more efficiently and speedily executed and processed with machine-learning specific processors (e.g., not a generic central processing unit (CPU)). Such processors may also provide additional energy savings when compared to generic CPUs. For example, some of these processors can include a graphical processing unit (GPU), an application-specific integrated circuit, a field-programmable gate array, an artificial intelligence accelerator, a purpose-built chip architecture for machine learning, and/or some other machine-learning specific processor that implements a machine learning approach using semiconductor (e.g., silicon, gallium arsenide) devices. These processors may also be employed in heterogeneous computing architectures with a number of and a variety of different types of cores, engines, nodes, and/or layers to achieve additional various energy efficiencies, processing speed improvements, data communication speed improvements, and/or data efficiency targets and improvements throughout various parts of the system.

Neural network model training application 122 performs operations associated with defining neural network model description 126 from data stored in training dataset 124. Neural network model description 126 may be used to predict a characteristic value for data stored training dataset 124 or in a second dataset 524 (shown referring to FIG. 5). The characteristic value may include one or more values that may be a probability that the associated observation vector has a predefined characteristic associated with each probability. Some or all of the operations described herein may be embodied in neural network model training application 122. The operations may be implemented using hardware, firmware, software, or any combination of these methods.

Referring to the example embodiment of FIG. 1, neural network model training application 122 is implemented in software (comprised of computer-readable and/or computer-executable instructions) stored in computer-readable medium 108 and accessible by processor 110 for execution of the instructions that embody the operations of neural network model training application 122. Neural network model training application 122 may be written using one or more programming languages, assembly languages, scripting languages, etc. Neural network model training application 122 may be integrated with other analytic tools. As an example, neural network model training application 122 may be part of an integrated data analytics software application and/or software architecture such as that offered by SAS Institute Inc. of Cary, N.C., USA. Merely for illustration, neural network model training application 122 may be implemented using or integrated with one or more SAS software tools such as JMP®, Base SAS, SAS® Enterprise Miner™, SAS® Event Stream Processing, SAS/STAT®, SAS® High Performance Analytics Server, SAS® Visual Data Mining and Machine Learning, SAS® LASR™, SAS® In-Database Products, SAS® Scalable Performance Data Engine, SAS® Cloud Analytic Services (CAS), SAS/OR®, SAS/ETS®, SAS® Visual Analytics, SAS® Viya™, SAS In-Memory Statistics for Hadoop®, etc. all of which are developed and provided by SAS Institute Inc. of Cary, N.C., USA. Data mining, statistical analytics, and response prediction are practically applied in a wide variety of industries to solve technical problems.

Neural network model training application 122 may be implemented as a Web application. For example, neural network model training application 122 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Training dataset 124 may include, for example, a plurality of rows and a plurality of columns. The plurality of rows may be referred to as observation vectors or records (observations), and the columns may be referred to as variables. In an alternative embodiment, training dataset 124 may be transposed. The plurality of variables define a vector $x_i$ for each observation vector i=1, 2, . . . , N, where N is a number of the observation vectors included in training dataset 124. Training dataset 124 may include additional variables that are not included in the plurality of variables. One or more variables of the plurality of variables may describe a characteristic of a physical object. For example, if training dataset 124 includes data related to operation of a vehicle, the variables may include a type of vehicle, an oil pressure, a speed, a gear indicator, a gas tank level, a tire pressure for each tire, an engine temperature, a radiator level, etc.

In data science, engineering, and statistical applications, data often consists of multiple measurements (across sensors, characteristics, responses, etc.) collected across multiple time instances (patients, test subjects, etc.). These measurements may be collected in training dataset 124 for analysis and processing or streamed to neural network model training device 100 as it is generated. Training dataset 124 may include data captured as a function of time for one or more physical objects. The data stored in training dataset 124 may be captured at different time points periodically, intermittently, when an event occurs, etc. Training dataset 124 may include data captured at a high data rate such as 200 or more observation vectors per second for one or more physical objects. One or more columns of training dataset 124 may include a time and/or date value. Training dataset 124 may include data captured under normal and abnormal operating conditions of the physical object.

The data stored in training dataset 124 may be received directly or indirectly from the source and may or may not be pre-processed in some manner. For example, the data may be pre-processed using an event stream processor such as the SAS® Event Stream Processing Engine (ESPE), developed and provided by SAS Institute Inc. of Cary, N.C., USA. For example, data stored in training dataset 124 may be generated as part of the Internet of Things (IoT), where things (e.g., machines, devices, phones, sensors) can be connected to networks and the data from these things collected and processed within the things and/or external to the things before being stored in training dataset 124. For example, the IoT can include sensors in many different devices and types of devices, and high value analytics can be applied to identify hidden relationships and drive increased efficiencies. This can apply to both big data analytics and real-time analytics. Some of these devices may be referred to as edge devices, and may involve edge computing circuitry. These devices may provide a variety of stored or generated data, such as network data or data specific to the network devices themselves. Again, some data may be processed with an ESPE, which may reside in the cloud or in an edge device before being stored in training dataset 124.

The data stored in training dataset 124 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art.

Training dataset 124 may be stored on computer-readable medium 108 or on one or more computer-readable media of distributed computing system 130 and accessed by neural network model training device 100 using communication interface 106, input interface 102, and/or output interface 104. Training dataset 124 may be stored in various compressed formats such as a coordinate format, a compressed sparse column format, a compressed sparse row format, etc. The data may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observation vectors (rows) and variables (columns) that can be processed by one or more SAS software tools.

Training dataset 124 may be stored using various data structures as known to those skilled in the art including one or more files of a file system, a relational database, one or more tables of a system of tables, a structured query language database, etc. on neural network model training device 100 or on distributed computing system 130. Neural network model training device 100 may coordinate access to training dataset 124 that is distributed across distributed computing system 130 that may include one or more computing devices. For example, training dataset 124 may be stored in a cube distributed across a grid of computers as understood by a person of skill in the art. As another example, training dataset 124 may be stored in a multi-node Hadoop® cluster. For instance, Apache™ Hadoop® is an open-source software framework for distributed computing supported by the Apache Software Foundation. As another example, training dataset 124 may be stored in a cloud of computers and accessed using cloud computing technologies, as understood by a person of skill in the art. The SAS® LASR™ Analytic Server may be used as an analytic platform to enable multiple users to concurrently access data stored in training dataset 124. The SAS Viya open, cloud-ready, in-memory architecture also may be used as an analytic platform to enable multiple users to concurrently access data stored in training dataset 124. SAS CAS may be used as an analytic server with associated cloud services in SAS Viya. Some systems may use SAS In-Memory Statistics for Hadoop® to read big data once and analyze it several times by persisting it in-memory for the entire session. Some systems may be of other types and configurations.

Figure 2A:
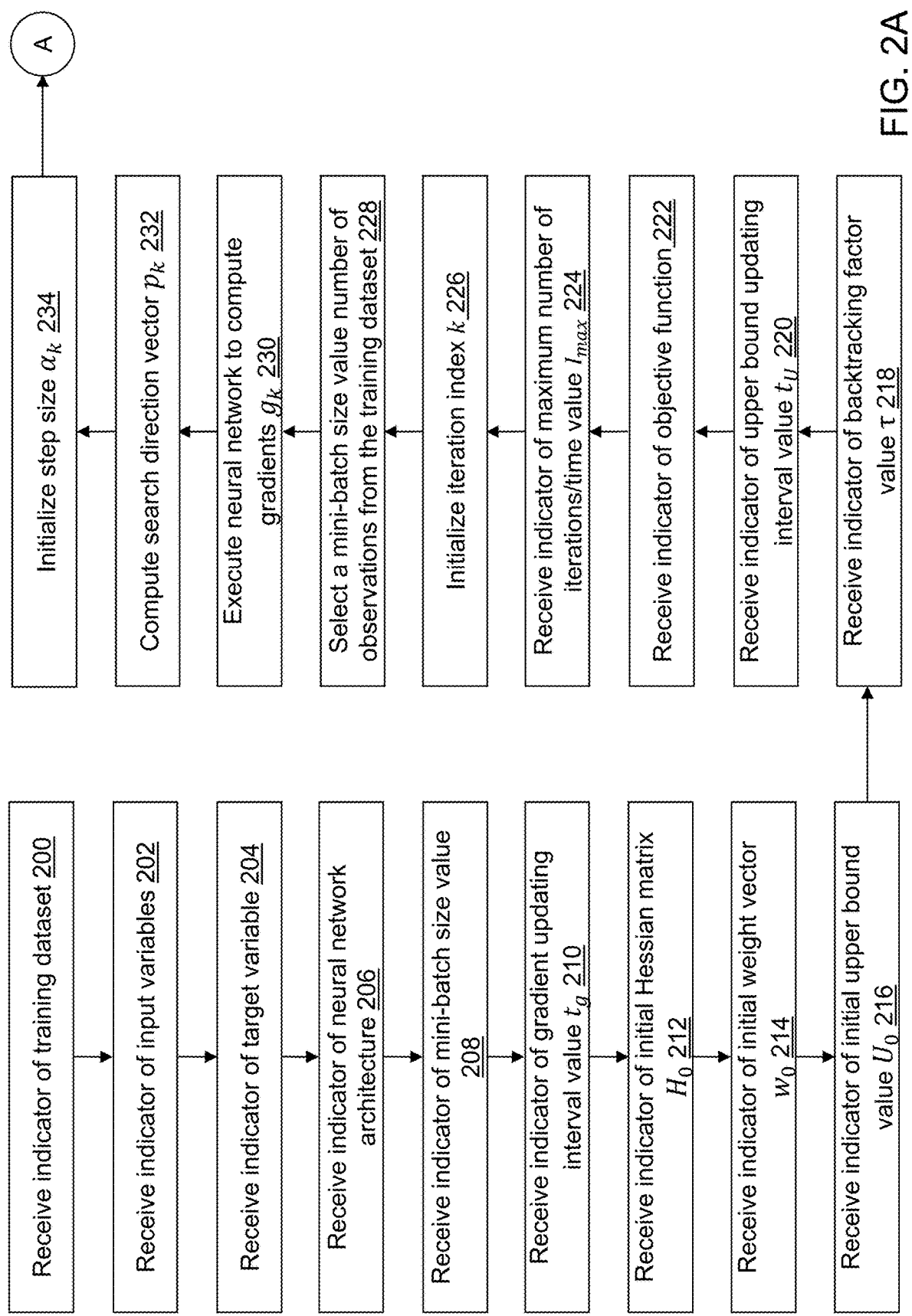
FIGS. 2A, 2B, and 2C depict a flow diagram illustrating examples of operations performed by a neural network model training application of the neural network model training device of FIG. 1 in accordance with an illustrative embodiment.
Figure 2B:
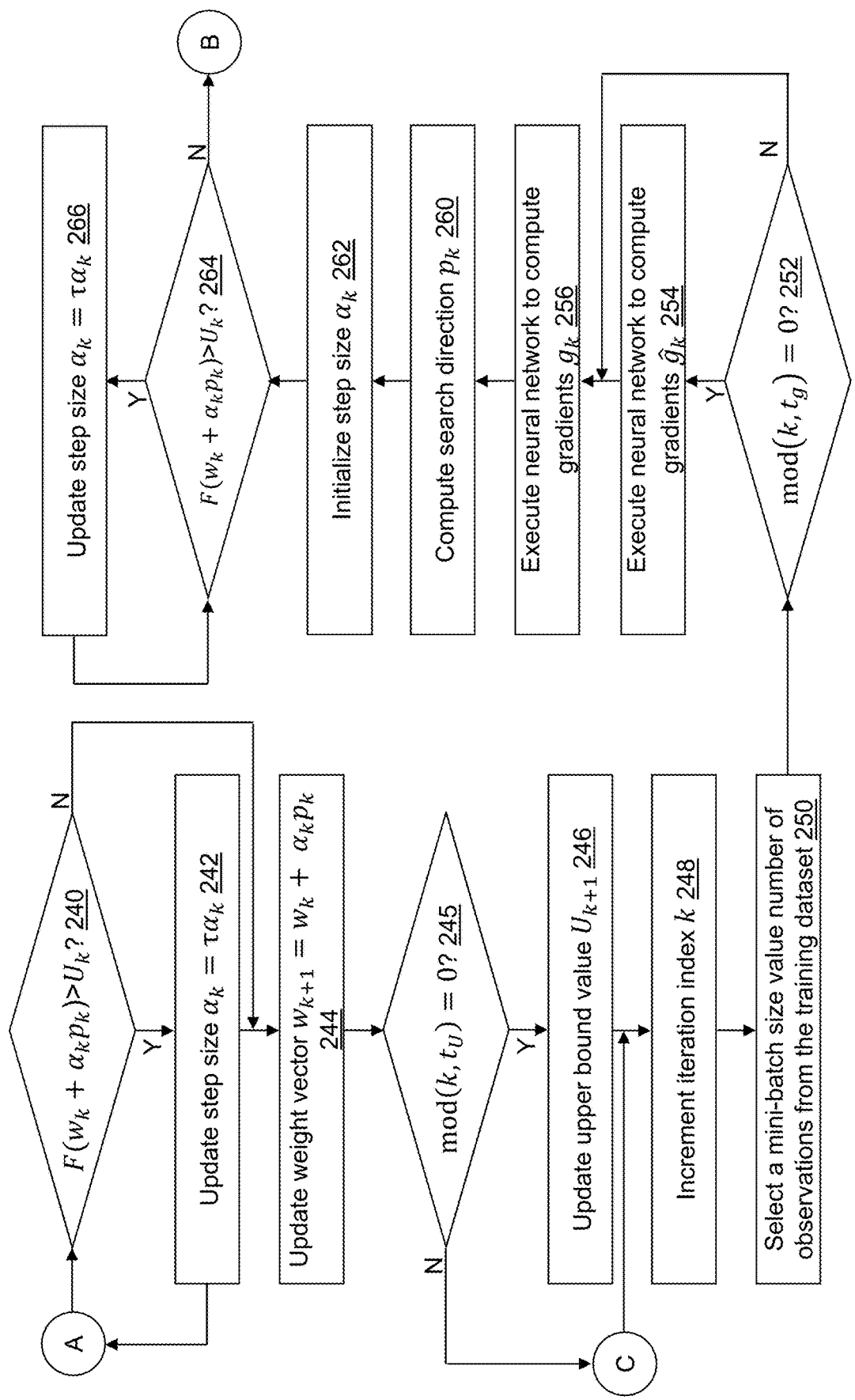
Figure 2C:
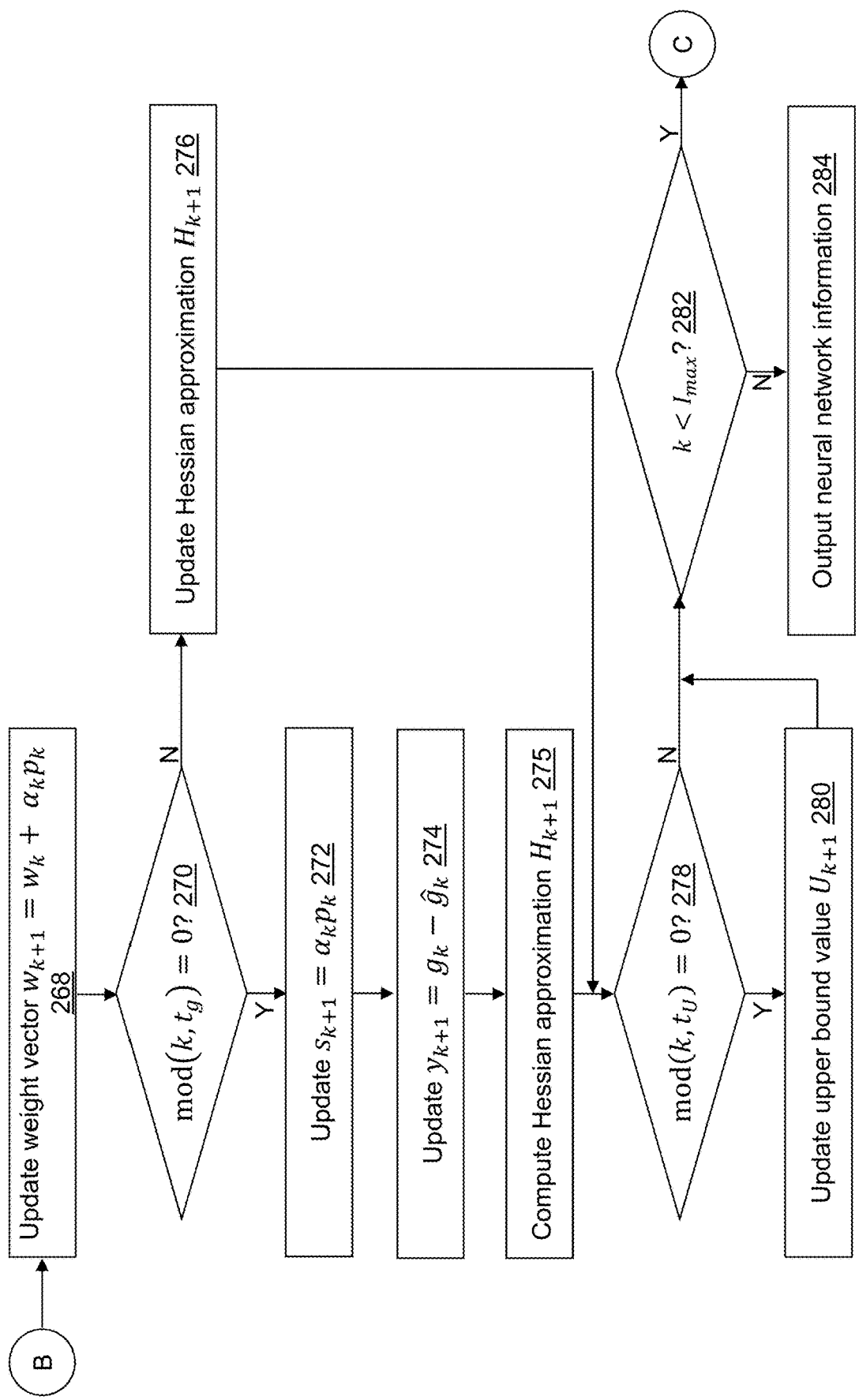

Referring to FIGS. 2A to 2C, example operations associated with neural network model training application 122 are described when training dataset 124 is stored on neural network model training device 100. Additional, fewer, or different operations may be performed depending on the embodiment of neural network model training application 122. The order of presentation of the operations of FIGS. 2A to 2C is not intended to be limiting. Some of the operations may not be performed in some embodiments. Although some of the operational flows are presented in sequence, the various operations may be performed in various repetitions and/or in other orders than those that are illustrated. For example, a user may execute neural network model training application 122, which causes presentation of a first user interface window, which may include a plurality of menus and selectors such as drop-down menus, buttons, text boxes, hyperlinks, etc. associated with neural network model training application 122 as understood by a person of skill in the art. The plurality of menus and selectors may be accessed in various orders. An indicator may indicate one or more user selections from a user interface, one or more data entries into a data field of the user interface, one or more data items read from computer-readable medium 108 or otherwise defined with one or more default values, etc. that are received as an input by neural network model training application 122. The operations of neural network model training application 122 further may be performed in parallel using a plurality of threads and/or a plurality of worker computing devices.

Referring to FIG. 2A, in an operation 200, a first indicator may be received that indicates training dataset 124. For example, the first indicator indicates a location and a name of training dataset 124. As an example, the first indicator may be received by neural network model training application 122 after selection from a user interface window or after entry by a user into a user interface window. In an alternative embodiment, training dataset 124 may not be selectable. For example, a most recently created dataset may be used automatically.

In an operation 202, a second indicator may be received that indicates a plurality of variables or features to include in training a neural network model using training dataset 124. For example, the second indicator may indicate a plurality of column numbers or a plurality of column names. As another option, all of the columns except a last column may be used by default. Each observation vector $x_i$, i=1, . . . , m read from training dataset 124 may include a value for each variable of the plurality of variables to define m dimensions or features. Training dataset 124 includes a set of observation vectors $X=[x_{j,i}]$, i=1, . . . , m, j=1, . . . , N. When a value for a variable of the plurality of variables is missing, the observation vector may not be included in the number of observation vectors N, a value may be computed for the missing variable, for example, based on neighbor values, etc. Training dataset 124 may be partitioned or otherwise divided into training, validation, and/or test datasets as part of training a neural network.

In an operation 204, a third indicator may be received that indicates a target variable (column) associated with each observation vector included in training dataset 124 to define a target variable vector $y_i$, i=1, . . . , N. The target variable may be a label for the associated observation vector. For example, the label may indicate a characteristic determined from the observation vector. For example, the third indicator indicates a variable to use by name, column number, etc. In an alternative embodiment, the third indicator may not be received. For example, the last variable in training dataset 124 may be used automatically.

In an operation 206, a fourth indicator indicates an architecture of the neural network to be trained to predict a value for the target variable. The fourth indicator may be received by neural network model training application 122 from a user interface window or after entry by a user into a user interface window. A default value for the architecture may further be stored, for example, in computer-readable medium 108. For illustration, the architecture defines a plurality of layers and their connectivity including a type of each layer. Illustrative layers include an input layer, a convolution layer, a pooling layer, an output layer, etc. One or more hyperparameters may be defined for each layer that may vary based on the type of each layer. For example, an activation function, a number of neurons, a number of groups, a dropout rate, a height and/or a width of a convolution window, a number of filters, an initialization method for filter weights, width and height padding dimensions, a number of categories or labels, a detection threshold, etc. may be defined as hyperparameters for training the neural network. The architecture may define a convolutional neural network, a deep, fully connected neural network, and/or a recurrent neural network. An automatic tuning method (autotune option) may be specified with one or more values or ranges of values to evaluate for each hyperparameter. The automatic tuning process may be used to identify the best settings for the hyperparameters though the hyperparameters may optionally be selected as an input option by a user.

Figure 3:
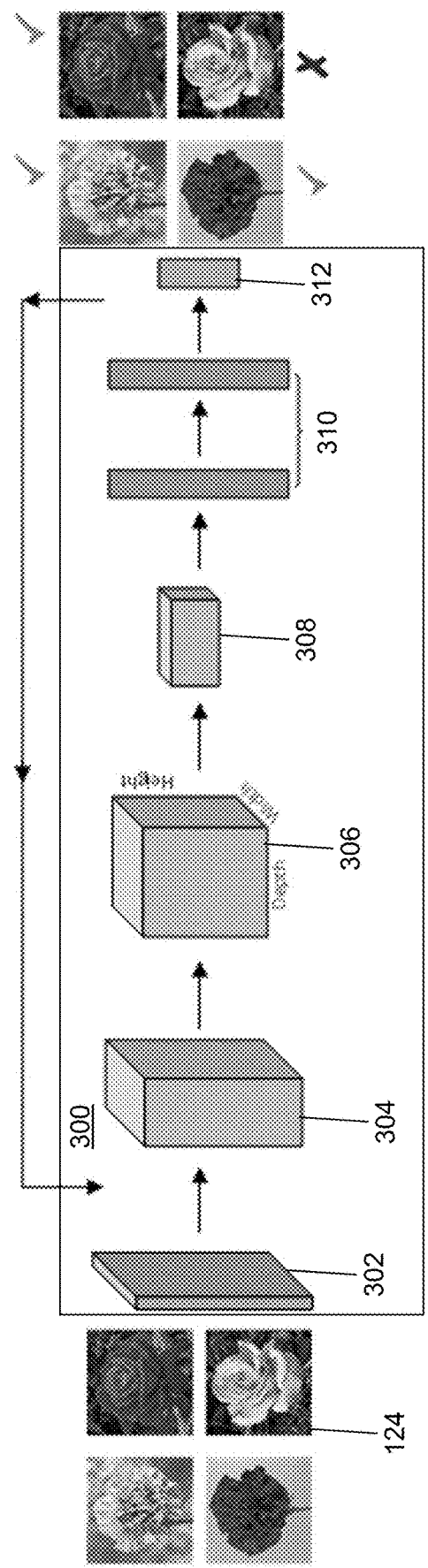
FIG. 3 depicts an illustrative neural network training process in accordance with an illustrative embodiment.

Referring to FIG. 3, an architecture 300 is shown in accordance with an illustrative embodiment. Training dataset 124 includes images of flowers. Architecture 300 includes an input layer 302 that provides input to a first convolution layer 304 that provides input to a second convolution layer 306 that provides input to a pooling layer 308 that provides input to a fully connected layer 310 that provides input to an output layer 312 that indicates a type of flower for each image. The flower type prediction may be correct or in error. A measure of the error in terms of an objective function is fed back to drive the adjustment of weights associated with each neuron of architecture 300. Gradients may be computed each iteration through back propagation through the architecture and also used to drive the adjustment of weights associated with each neuron of architecture 300 as described further below.

In an operation 208, a fifth indicator of a mini-batch size value may be received. In an alternative embodiment, the fifth indicator may not be received. For example, a default value may be stored, for example, in computer-readable medium 108 and used automatically. In another alternative embodiment, the value of the mini-batch size value may not be selectable. Instead, a fixed, predefined value may be used. For illustration, a default value for the mini-batch size value may be 4 though other values may be used. The mini-batch size value indicates a mini-batch size used to repeatedly select observation vectors from training dataset 124 as part of the training of the neural network defined in operation 206.

In an operation 210, a sixth indicator of a gradient updating interval value $t_g$ may be received. In an alternative embodiment, the sixth indicator may not be received. For example, a default value may be stored, for example, in computer-readable medium 108 and used automatically. In another alternative embodiment, the value of the gradient updating interval value $t_g$ may not be selectable. Instead, a fixed, predefined value may be used. For illustration, a default value of the gradient updating interval value $t_g$ may be 2 though other values may be used. The gradient updating interval value $t_g$ indicates how frequently a gradient is computed at a beginning of an iteration as part of the training of the neural network defined in operation 206.

In an operation 212, a seventh indicator of an initial Hessian matrix $H_0$ or a methodology by which the initial Hessian matrix $H_0$ is defined may be received. In an alternative embodiment, the seventh indicator may not be received. For example, a default matrix may be stored, for example, in computer-readable medium 108 and used automatically. In another alternative embodiment, the initial Hessian matrix $H_0$ may not be definable. Instead, a fixed, predefined matrix may be used such as the identity matrix. In an illustrative embodiment, the methodology may be to read values from a Hessian matrix input file indicated by the seventh indicator or by default.

In an operation 214, an eighth indicator of an initial weight vector $w_0$ or a methodology by which the initial weight vector $w_0$ is defined may be received. In an alternative embodiment, the eighth indicator may not be received. For example, a default value may be stored, for example, in computer-readable medium 108 and used automatically. In another alternative embodiment, the initial weight vector $w_0$ may not be definable. Instead, a fixed, predefined vector may be used. In an illustrative embodiment, the methodology may be to read values from a weight vector input file indicated by the eighth indicator or by default.

In an operation 216, a ninth indicator of an initial upper bound value $U_0$ may be received. In an alternative embodiment, the ninth indicator may not be received. For example, a default value may be stored, for example, in computer-readable medium 108 and used automatically. In another alternative embodiment, the value of the initial upper bound value $U_0$ may not be selectable. Instead, a fixed, predefined value may be used. For illustration, a default value of the initial upper bound value $U_0$ may be a large value such as 1e20 to ensure no backtrack when computing a step size at a first iteration as described further below though other values may be used. The initial upper bound value $U_0$ indicates a maximum error value of the objective function that is used to determine a step size as part of the training of the neural network defined in operation 206.

In an operation 218, a tenth indicator of a backtracking factor value $\tau$ may be received. In an alternative embodiment, the tenth indicator may not be received. For example, a default value may be stored, for example, in computer-readable medium 108 and used automatically. In another alternative embodiment, the value of the backtracking factor value $\tau$ may not be selectable. Instead, a fixed, predefined value may be used. The backtracking factor value $\tau$ may have any value between zero and one. For illustration, a default value of the backtracking factor value may be $\tau=\ln(2)$ though other values may be used. The backtracking factor value $\tau$ is a control parameter value that is used to adjust a step size as part of the training of the neural network defined in operation 206.

In an operation 220, an eleventh indicator of an upper bound updating interval value $t_U$ may be received. In an alternative embodiment, the eleventh indicator may not be received. For example, a default value may be stored, for example, in computer-readable medium 108 and used automatically. In another alternative embodiment, the value of the upper bound updating interval value $t_U$ may not be selectable. Instead, a fixed, predefined value may be used. For illustration, a default value of the upper bound updating interval value $t_U$ may be 4 though other values may be used. The upper bound updating interval value $t_U$ indicates how frequently an upper bound value $U_k$ that indicates a maximum error value of the objective function is updated as part of the training of the neural network defined in operation 206.

In an operation 222, a twelfth indicator of an objective function used to compute a model error may be received. In an alternative embodiment, the twelfth indicator may not be received. For example, a default objective function may be stored, for example, in computer-readable medium 108 and used automatically. In another alternative embodiment, the objective function may not be selectable. Instead, a fixed, predefined objective function may be used. For illustration, a default objective function may be $$F(w) = \frac{1}{N}\sum_{i=0}^{N} L(w; x_i, y_i) + \lambda_1 \|w\|_1 + \frac{\lambda_2}{2}\|w\|_2^2$$

where $L(w; x_i, y_i)$, is the loss associated with observation i having observation vector $x_i$ with the correct classification $y_i$, $\lambda_1$ is the L1 regularization parameter, and $\lambda_2$ is the L2 regularization parameter, though other functions may be used. $\lambda_1$ and $\lambda_2$ are greater than or equal to zero. Default values for $\lambda_1$ and $\lambda_2$ may be zero.

In an operation 224, a thirteenth indicator of a maximum number of iterations $I_{max}$ may be received. In an alternative embodiment, the thirteenth indicator may not be received. For example, a default value may be stored, for example, in computer-readable medium 108 and used automatically. In another alternative embodiment, the value of the maximum number of iterations $I_{max}$ may not be selectable. Instead, a fixed, predefined value may be used. For illustration, a default value of the maximum number of iterations $I_{max}$ may be 250 though other values may be used. The maximum number of iterations $I_{max}$ indicates how many iterations are performed as part of the training of the neural network defined in operation 206 before training is stopped. Training may also be stopped when a convergence criterion is achieved that may be specified by the fourth indicator or by the twelfth indicator or otherwise provided as an input to neural network model training application 122. In alternative embodiments, a maximum computing time may be specified in addition to or instead of the maximum number of iterations $I_{max}$ and used in a similar manner to stop the training process when the maximum computing time is reached.

In an operation 226, an iteration index k is initialized, for example, as k=0.

In an operation 228, a mini-batch size value number of observation vectors are selected from training dataset 228. The observation vectors may be randomly selected from training dataset 228 with replacement in an illustrative embodiment.

In an operation 230, the neural network defined by the architecture specified in operation 206 is executed with the selected observation vectors to compute weight vector $w_k$ and gradient vector $g_k$ that includes values for each neuron of the neural network.

In an operation 232, a search direction vector $p_k$ is computed using $p_k=-H_k g_k$. The search direction vector $p_k$ includes a value for each variable of the plurality of variables indicated in operation 202.

In an operation 234, a step size $\alpha_k$ is initialized, for example, using $\alpha_k=1$, and processing continue in an operation 240 shown referring to FIG. 2B.

Referring to FIG. 2B, in operation 240, a determination is made concerning whether $F(w_k+\alpha_k p_k)>U_k$, where $F(\ )$ indicates the objective function defined in operation 222 executed with the parameter $w_k+\alpha_k p_k$. When $F(w_k+\alpha_k p_k)>U_k$, processing continues in an operation 242. When $F(w_k+\alpha_k p_k) \leq U_k$, processing continues in an operation 244.

In operation 242, step size $\alpha_k$ is updated, for example, using $\alpha_k=\tau\alpha_k$, and processing continues in operation 240 to continue to adjust step size $\alpha_k$ until the value of the objective function exceeds the upper bound value $U_k$. Operations 240 and 242 compute a step size $\alpha_k$ that produces an objective function value $F(w_k+\alpha_k p_k)$ that is not worse than $U_k$. The step size $\alpha_k$ is reduced only when a series of unproductive iterations is encountered and requires fewer function evaluations and can often bypass local minima with unpromising objective values.

In operation 244, the weight vector for a next iteration $w_{k+1}$ is updated, for example, using $w_{k+1} = w_k + \alpha_k p_k$.

In an operation 245, a determination is made concerning whether mod(k, $t_U$)=0, where mod indicates the modulus function. When mod(k, $t_U$)=0, processing continues in an operation 246. When mod(k, $t_U$)≠0, processing continues in an operation 248.

In operation 246, the upper bound value for a next iteration $U_{k+1}$ is updated, for example, using $$U_{k+1} = 0.1 \left( \frac{1}{t_U} \sum_{i=1}^{t_U} U_{k-i} \right) + 0.9 U_0.$$

The objective Upper bound $U_{k+1}$ evolves according to search progress. $U_{k+1}$ is adjusted every $t_U$ iterations where $t_U$ may be equal to one.

In an operation 248, the iteration index k is incremented, for example, using k=k+1.

Similar to operation 228, in an operation 250, a mini-batch size value number of observation vectors are selected from training dataset 228.

In an operation 252, a determination is made concerning whether mod(k, $t_g$)=0. When mod(k, $t_g$)=0, processing continues in an operation 254. When mod(k, $t_g$)≠0, processing continues in an operation 256.

In operation 254, the neural network defined by the architecture specified in operation 206 is executed with the selected observation vectors and the weight vector $w_{k-1}$ computed for the previous iteration to compute a gradient vector $\hat{g}_k$ that includes values for each neuron of the neural network. Gradient vector $\hat{g}_k$ may be referred to as a pre-iteration gradient vector $\hat{g}_k$.

In operation 256, the neural network defined by the architecture specified in operation 206 is executed with the selected observation vectors to compute weight vector $w_k$ and gradient vector $g_k$ that includes values for each neuron of the neural network. Gradient vector $g_k$ may be referred to as a post-iteration gradient vector $g_k$.

In order to understand the new sampling strategy, it is necessary to provide more details on the BFGS update given by:

$$B_{k+1} = B_k - \frac{B_k s_k s_k^T B_k}{s_k^T B_k s_k} + \frac{y_k y_k^T}{s_k^T y_k},$$

where the inverse of $B_{k+1}$ denoted by $H_{k+1}$ is obtained by a similar rank-2 update on $H_k$. The only difference for the L-BFGS is that only the last q pairs $(s_{k-q+j}, y_{k-q+j})_{j=1}^q$ are used to form $B_{k+1}$ to reduce the amount of memory used. It is easy to show that $B_{k+1} s_k = y_k$. By the first order Taylor expansion of F(w) for full-batched L-BFGS, $$B_{k+1} s_k = y_k = \nabla F(w_k + s_k) - \nabla F(w_k)$$
$$= H(w_k) s_k + O(\|s_k\|^2),$$

where $H(w_k) = \nabla^2 f(w_k)$. Thus, every iteration the approximate Hessian matrix $B_{k+1}$ behaves similar to the true Hessian $H(w_k)$ along the direction $s_k$.

Processing data points by mini-batches is an effective approach to make stochastic L-BFGS scale to big model training. As discussed previously, standard stochastic L-BFGS uses the gradient pairs from different mini-batches to estimate the inverse Hessian matrix, which induces two forms of error in the Hessian approximation formula. The first is $O(\|s_k\|^2)$ which is benign and goes to zero with the step-size, which it must do for convergence occur. The second is unique to the stochastic case where different mini-batches may destroy the Taylor approximation correspondence in that there is no guarantee $$\nabla F_{D_{k+1}}(w_k) \approx \nabla F_{D_k}(w_k)$$

where $D_{k+1}$ and $D_k$ are mini-batches of observations at iteration k+1 and k. This produces inaccurate Hessian updates, which causes unstable training that is unique to the stochastic case. Past approaches have sought to correct this issue by either using very large mini-batch-sizes and/or increasing the size of $D_{k+1} \cap D_k$ (for SGD, typically $D_{k+1} \cap D_k = 0$). This creates a sensitive hyperparameter that must balance overall convergence with the increased computational load of extra evaluations per iteration.

To obtain stable curvature information using neural network model training application 122, an extra gradient computation of pre-iteration gradient vector $\hat{g}_k$ at the beginning of a batch process is performed in operation 254 based on the gradient updating interval value $t_g$. Pre-iteration gradient vector $\hat{g}_k$ is computed using the weights $w_{k-1}$ calculated in the previous iteration with the observation vectors selected in operation 250. Post-iteration gradient vector $g_k$ is computed using the weights $w_k$ calculated in the current iteration with the observation vectors selected in operation 250. At iteration mod(k, $t_g$)=0, both $\hat{g}_k$ and $g_k$ are computed and the gradient difference $g_k - \hat{g}_k$ is used to update the Hessian approximation matrix $H_k$, instead of $g_k - g_{k-1}$. $g_k$ is computed using the weights calculated in iteration k. A user can tune the gradient updating interval value $t_g$ based on their application. Unlike recomputing the gradients at the beginning of each iteration or never recomputing the gradients at the beginning of an iteration as performed by existing stochastic L-BFGS methods, neural network model training application 122 is flexible and can reduce the computational cost significantly. In addition to stabilizing the curvature information, the operations are straightforward to implement and do not require extra working memory.

In an operation 260, the search direction vector $p_k$ is computed using $p_k = -H_k \hat{g}_k$ when mod(k, $t_g$)=0, or $p_k = -H_k g_k$ when mod(k, $t_g$)≠0.

In an operation 262, the step size $\alpha_k$ is initialized, for example, using $\alpha_k = 1$.

In an operation 264, a determination is made concerning whether $F(w_k + \alpha_k p_k) > U_k$. When $F(w_k + \alpha_k p_k) > U_k$, processing continues in an operation 266. When $F(w_k + \alpha_k p_k) \leq U_k$, processing continues in an operation 268 shown referring to FIG. 2C.

In operation 266, step size $\alpha_k$ is updated, for example, using $\alpha_k = \tau \alpha_k$, and processing continues in operation 264 to continue to adjust step size $\alpha_k$ until the value of the objective function exceeds the upper bound value $U_k$.

Referring to FIG. 2C, in operation 268, the weight vector for a next iteration $W_{k+1}$ is updated, for example, using $W_{k+1} = w_k + a_k p_k$.

In an operation 270, a determination is made concerning whether mod(k, $t_g$)=0. When mod(k, $t_g$)=0, processing continues in an operation 272. When mod(k, $t_g$)≠0, processing continues in an operation 276.

In operation 272, $s_{k+1} = \alpha_k p_k$ is computed.

In operation 274, $y_{k+1} = g_k - \hat{g}_k$ is computed.

In an operation 275, the Hessian approximation matrix $H_{k+1}$ is computed using $s_{k+1}$ and $y_{k+1}$, and processing continues in an operation 278.

In an operation 276, the Hessian approximation matrix $H_{k+1}$ is updated using $H_{k+1} = H_k$.

In operation 278, a determination is made concerning whether mod(k, $t_U$)=0. When mod(k, $t_U$)=0, processing continues in an operation 280. When mod(k, $t_u$)≠0, processing continues in an operation 282.

In operation 280, the upper bound value for a next iteration $U_{k+1}$ is updated, for example, using $$U_{k+1} = 0.1\left(\frac{1}{t_U}\sum_{i=1}^{t_U} U_{k-i}\right) + 0.9 U_0.$$

In operation 282, a determination is made concerning whether $k < I_{max}$. When $k < I_{max}$, processing continues in operation 248 to perform another iteration. When $k \geq I_{max}$, processing continues in operation 284.

In operation 284, the neural network model description including $w_k$ is output. For example, the neural network model description may be output to neural network model description 126. The neural network model description may include the neural network architecture. For illustration, the trained neural network model may be stored using the ASTORE procedure provided by SAS® Visual Data Mining and Machine Learning software.

The operations of neural network model training application 122 can be executed in parallel to speed up the training process. Neural network model training application 122 may be executed in a synchronous mode that distributes the gradient computations across a plurality of worker computing devices. Each worker computing device computes the gradient for a portion of training dataset 124 that resides on that worker computing device, and the computed gradients are aggregated on a controller computing device. The weights are updated with the computed gradients and are sent to each worker computing device so that the processing for the next iteration can proceed with the updated weights.

Experimental results were generated using the operations of neural network model training application 122 and an existing L-BFGS algorithm. For example, the existing L-BFGS algorithm included in the SAS Deep Learning Toolkit was used. The model used was DenseNet with 153,000 parameters. The dataset used was CIFAR 10 that was partitioned into 50,000 training images and 10,000 test images. The mini-batch size value selected was 4, and the maximum number of iterations was 60. Table I below includes the comparative results when using neural network model training application 122 and when using the existing L-BFGS algorithm with the operations distributed on a four-worker CPU system.

TABLE I

| Algorithm | Max Iterations | Fit Error | Training Time (seconds) |
|---|---|---|---|
| Neural network model training application 122 | 60 | 0.4109 | 15891.06 |
| Existing L-BFGS | 60 | 0.3554 | 2420.47 |

Using the operations of FIGS. 2A to 2C resulted in a training error improvement that was about 13.5% better and a computing time that was 6.6 times faster than the existing L-BFGS algorithm.

Table II below includes the comparative results when using neural network model training application 122 and when using the existing L-BFGS algorithm on a server with two GPUs instead of the four-worker CPU system.

TABLE II

| Algorithm | Max Iterations | Fit Error | Training Time (seconds) |
|---|---|---|---|
| Neural network model training application 122 | 60 | 0.2188 | 739.30 |
| Existing L-BFGS | 38 | 0.3198 | 2108.30 |

Using neural network model training application 122 resulted in a training error improvement that was about 46.6% better and a computing time that was 4.5 times faster than the existing L-BFGS algorithm. Training using the existing L-BFGS algorithm stopped at iteration 38 due to numerical difficulty. The results presented in Tables I and II demonstrate that neural network model training application 122 simultaneously provides both improved stability in model training and a significant speed up in training time.

Experimental results were also generated using the operations of neural network model training application 122, the ADAM-SGD optimization algorithm, and the Momentum-SGD optimization algorithm. For example, the ADAM-SGD optimization algorithm and the Momentum-SGD optimization algorithm included in the SAS Deep Learning Toolkit was used. The model used was LeNet with 60,000 parameters. The dataset used was Fashion MNIST partitioned into 60,000 training images and 10,000 test images. Using the ADAM-SGD optimization algorithm and the Momentum-SGD optimization algorithm, their hyperparameters were manually tuned. Using neural network model training application 122, the batch size selected was 4, and the maximum number of iterations was 30. Table III below shows the comparative results when using neural network model training application 122, when using the ADAM-SGD optimization algorithm, and when using the Momentum-SGD optimization algorithm with the operations distributed on a four-worker CPU system.

TABLE III

| Algorithm | Max Iterations | Fit Error | Training Time (seconds) |
|---|---|---|---|
| Neural network model training application 122 | 30 | 0.0427 | 657.57 |
| ADAM-SGD | 30 | 0.1498 | 459.23 |
| Momentum-SGD | 30 | 0.0685 | 741.01 |

The results show that neural network model training application 122 can produce very competitive results compared with manually tuned SGD optimizers when the model size is moderate. Neural network model training application 122 resulted in a much lower fit error though computed 30% slower than using the ADAM-SGD optimization algorithm. Neural network model training application 122 resulted in a lower fit error computed 12.7% faster than using the Momentum-SGD optimization algorithm.

Figure 4:
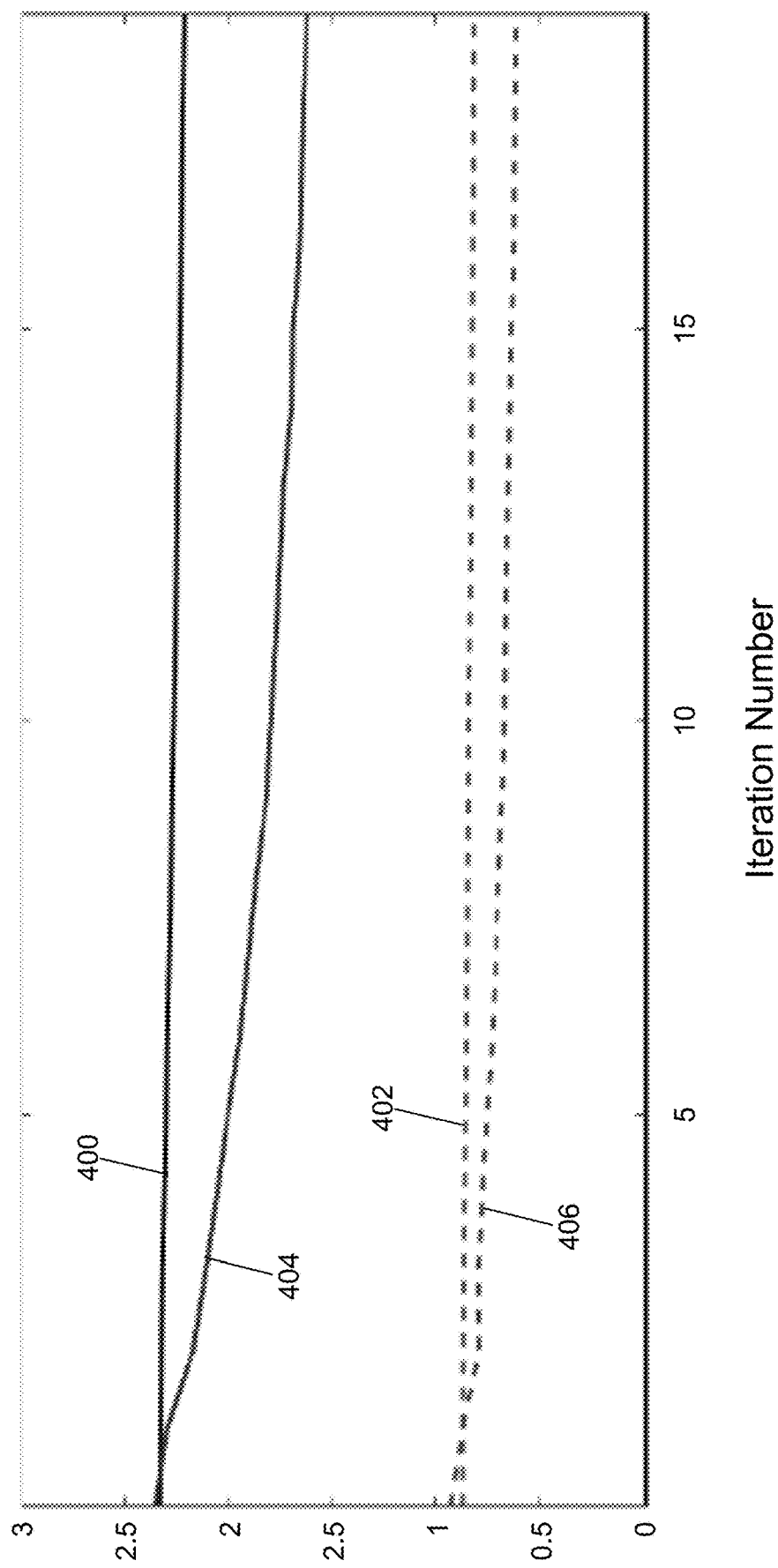
FIG. 4 shows a loss and a fit error comparison using the operations of FIGS. 2A to 2C and using a preexisting SGD neural network training method in accordance with an illustrative embodiment.

Referring to FIG. 4, a loss and a fit error comparison are shown as a function of the iteration number when using neural network model training application 122 and when using the Momentum-SGD optimization algorithm on an eight-worker CPU system. The mini-batch size value selected was 128. A first loss curve 400 shows the loss that results after each iteration using the ADAM-SGD optimization algorithm. A second loss curve 402 shows the loss that results after each iteration using neural network model training application 122. A first fit error curve 404 shows the fit error that results after each iteration using the ADAM-SGD optimization algorithm. A second fit error curve 406 shows the fit error that results after each iteration using neural network model training application 122. The ADAM-SGD optimization algorithm was trapped in a search space and made very little progress after the first iteration while neural network model training application 122 continued to reduce the loss and fit error with each iteration.

Experimental results were also generated using the ADAM-SGD optimization algorithm in comparison with a hybrid optimization that used the ADAM-SGD optimization algorithm followed by the operations of neural network model training application 122 on a five-worker CPU system. The model used was DenseNet with 153,000 parameters. The dataset used was CIFAR 10 partitioned into 50,000 training images and 10,000 test images. The mini-batch size value selected was 4. Table IV below shows the comparative results.

TABLE IV

| Algorithm | Max Iterations | Fit Error | Training Time (seconds) |
| --- | --- | --- | --- |
| ADAM-SGD + neural network model training application 122 | 60 + 20 | 0.1119 | 1782.36 |
| ADAM-SGD | 80 | 0.1139 | 2023.60 |

The results show that the combination resulted in a lower fit error 11.9% faster.

Figure 5:
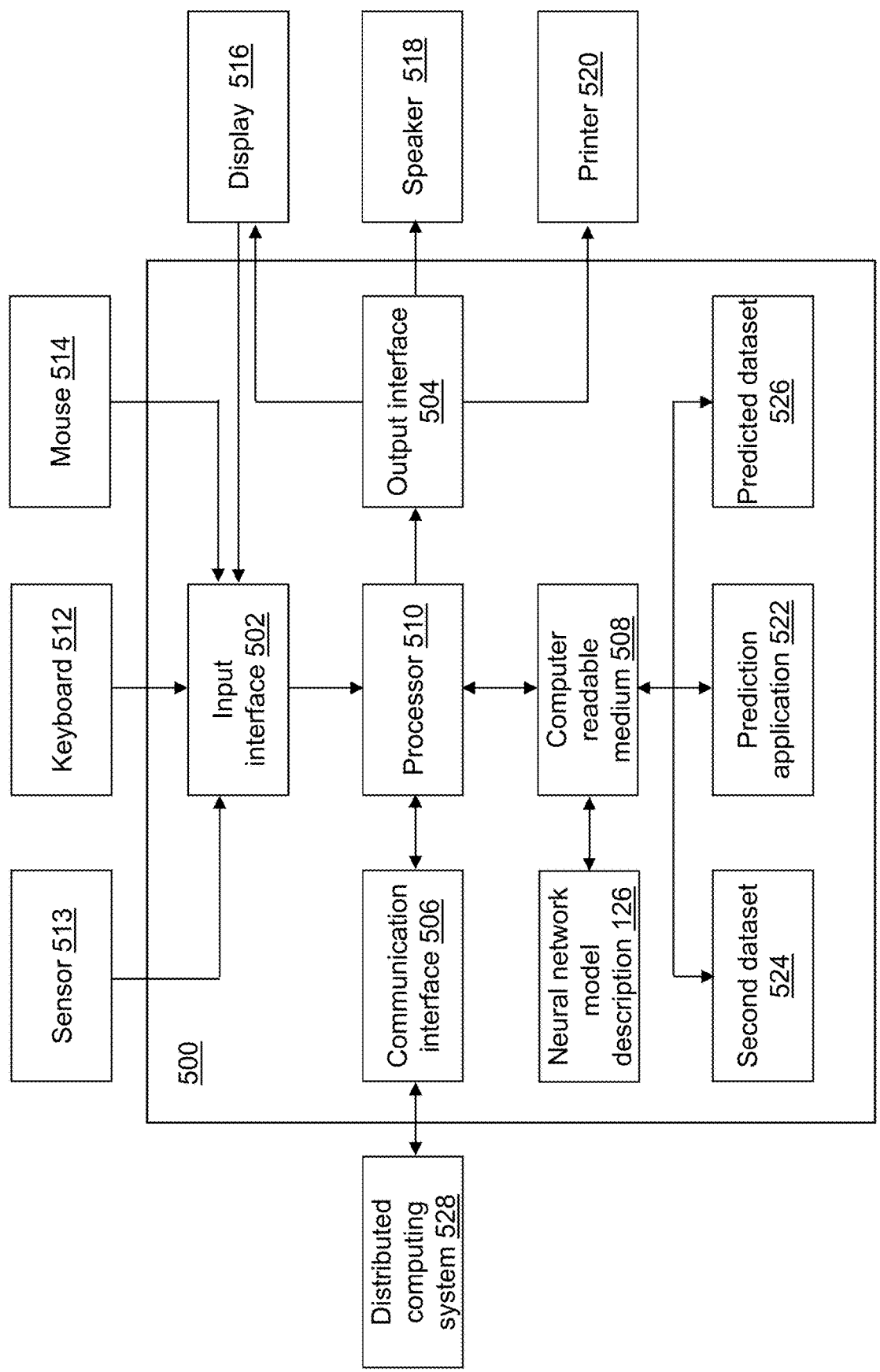
FIG. 5 depicts a block diagram of a prediction device in accordance with an illustrative embodiment.

Referring to FIG. 5, a block diagram of a prediction device 500 is shown in accordance with an illustrative embodiment. Prediction device 500 may include a second input interface 502, a second output interface 504, a second communication interface 506, a second non-transitory computer-readable medium 508, a second processor 510, a prediction application 522, neural network model description 126, second dataset 524, and predicted dataset 526. Fewer, different, and/or additional components may be incorporated into prediction device 500. Prediction device 500 and neural network model training device 100 may be the same or different devices.

Second input interface 502 provides the same or similar functionality as that described with reference to input interface 102 of neural network model training device 100 though referring to prediction device 500. Second output interface 504 provides the same or similar functionality as that described with reference to output interface 104 of neural network model training device 100 though referring to prediction device 500. Second communication interface 506 provides the same or similar functionality as that described with reference to communication interface 106 of neural network model training device 100 though referring to prediction device 500. Data and messages may be transferred between prediction device 500 and a distributed computing system 528 using second communication interface 506. Distributed computing system 130 and distributed computing system 528 may be the same or different computing systems. Second computer-readable medium 508 provides the same or similar functionality as that described with reference to computer-readable medium 108 of neural network model training device 100 though referring to prediction device 500. Second processor 510 provides the same or similar functionality as that described with reference to processor 110 of neural network model training device 100 though referring to prediction device 500.

Prediction application 522 performs operations associated with classifying or predicting a characteristic value related to each observation vector included in second dataset 524. The predicted characteristic value may be stored in predicted dataset 526 to support various data analysis functions as well as provide alert/messaging related to each prediction that may be a classification. Dependent on the type of data stored in training dataset 124 and second dataset 524, prediction application 522 may identify anomalies as part of process control, for example, of a manufacturing process, for machine condition monitoring, for image classification, for intrusion detection, for fraud detection, for voice recognition, for language translation, etc. Some or all of the operations described herein may be embodied in prediction application 522. The operations may be implemented using hardware, firmware, software, or any combination of these methods.

Referring to the example embodiment of FIG. 5, prediction application 522 is implemented in software (comprised of computer-readable and/or computer-executable instructions) stored in second computer-readable medium 508 and accessible by second processor 510 for execution of the instructions that embody the operations of prediction application 522. Prediction application 522 may be written using one or more programming languages, assembly languages, scripting languages, etc. Prediction application 522 may be integrated with other analytic tools. As an example, prediction application 522 may be part of an integrated data analytics software application and/or software architecture such as that offered by SAS Institute Inc. of Cary, N.C., USA. For example, prediction application 522 may be part of SAS® Enterprise Miner™ developed and provided by SAS Institute Inc. of Cary, N.C., USA. Merely for further illustration, prediction application 522 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Visual Analytics, SAS® Viya™, SAS In-Memory Statistics for Hadoop®, all of which are developed and provided by SAS Institute Inc. of Cary, N.C., USA.

One or more operations of prediction application 522 further may be performed by an ESPE on an event stream instead of reading observation vectors from second dataset 524. Prediction application 522 and neural network model training application 122 may be the same or different applications that are integrated in various manners to train a neural network model using training dataset 124 that may be distributed on distributed computing system 130 and to execute the trained neural network model to predict the characteristic of each observation vector included in second dataset 524 that may be distributed on distributed computing system 528.

Prediction application 522 may be implemented as a Web application. Dependent on the type of data stored in training dataset 124 and second dataset 524, prediction application 522 may identify anomalies as part of process control, for example, of a manufacturing process, for machine condition monitoring, for image classification, for text recognition, for voice recognition, for intrusion detection, for fraud detection, etc.

Prediction application 522 may be integrated with other system processing tools to automatically process data generated as part of operation of an enterprise, to classify data in the processed data, and/or to provide a warning or alert associated with the prediction using second input interface 502, second output interface 504, and/or second communication interface 506 so that appropriate action can be initiated in response. For example, a warning or an alert may be presented using a second display 516, a second speaker 518, a second printer 520, etc. or sent to one or more computer-readable media, display, speaker, printer, etc. of distributed computing system 528.

Training dataset 124 and second dataset 524 may be generated, stored, and accessed using the same or different mechanisms. The target variable is not defined in second dataset 524. Similar to training dataset 124, second dataset 524 may include a plurality of rows and a plurality of columns with the plurality of rows referred to as observations or records, and the columns referred to as variables that are associated with an observation. Second dataset 524 may be transposed.

Similar to training dataset 124, second dataset 524 may be stored on second computer-readable medium 508 or on one or more computer-readable media of distributed computing system 528 and accessed by prediction device 500 using second communication interface 506. Data stored in second dataset 524 may be a sensor measurement or a data communication value, for example, from a sensor 513, may be generated or captured in response to occurrence of an event or a transaction, generated by a device such as in response to an interaction by a user with the device, for example, from a second keyboard 512 or a second mouse 514, etc. The data stored in second dataset 524 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The data stored in second dataset 524 may be captured at different time points periodically, intermittently, when an event occurs, etc. One or more columns may include a time value. Similar to training dataset 124, data stored in second dataset 524 may be generated as part of the IoT, and some or all data may be pre- or post-processed by an ESPE.

Similar to training dataset 124, second dataset 524 may be stored in various compressed formats such as a coordinate format, a compressed sparse column format, a compressed sparse row format, etc. Second dataset 524 further may be stored using various structures as known to those skilled in the art including a file system, a relational database, a system of tables, a structured query language database, etc. on prediction device 500 and/or on distributed computing system 528. Prediction device 500 may coordinate access to second dataset 524 that is distributed across a plurality of computing devices that make up distributed computing system 528. For example, second dataset 524 may be stored in a cube distributed across a grid of computers as understood by a person of skill in the art. As another example, second dataset 524 may be stored in a multi-node Hadoop® cluster. As another example, second dataset 524 may be stored in a cloud of computers and accessed using cloud computing technologies, as understood by a person of skill in the art. The SAS® LASR™ Analytic Server and/or SAS® Viya™ may be used as an analytic platform to enable multiple users to concurrently access data stored in second dataset 524.

Figure 6:
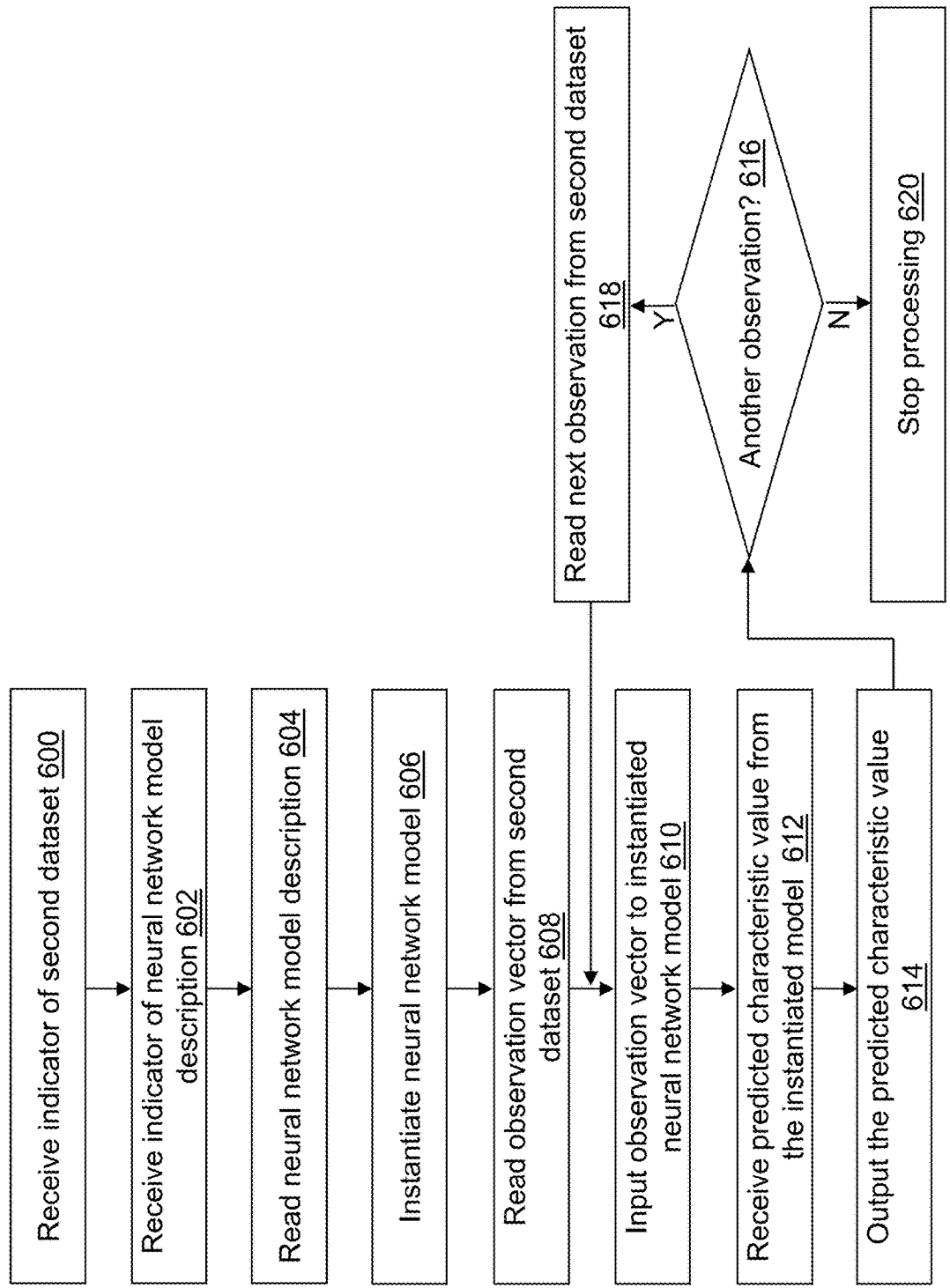
FIG. 6 depicts a flow diagram illustrating examples of operations performed by the prediction device of FIG. 5 in accordance with an illustrative embodiment.

Referring to FIG. 6, example operations of prediction application 522 are described. Additional, fewer, or different operations may be performed depending on the embodiment of prediction application 522. The order of presentation of the operations of FIG. 6 is not intended to be limiting. Although some of the operational flows are presented in sequence, the various operations may be performed in various repetitions, concurrently (in parallel, for example, using threads and/or distributed computing system 528), and/or in other orders than those that are illustrated.

In an operation 600, a fourteenth indicator may be received that indicates second dataset 524. For example, the fourteenth indicator indicates a location and a name of second dataset 524. As an example, the fourteenth indicator may be received by prediction application 522 after selection from a user interface window or after entry by a user into a user interface window. In an alternative embodiment, second dataset 524 may not be selectable. For example, a most recently created dataset may be used automatically.

In an operation 602, a fifteenth indicator may be received that indicates neural network model description 126. For example, the fifteenth indicator indicates a location and a name of neural network model description 126. As an example, the fifteenth indicator may be received by prediction application 522 after selection from a user interface window or after entry by a user into a user interface window. In an alternative embodiment, neural network model description 126 may not be selectable. For example, a most recently created model configuration data may be used automatically. As another example, neural network model description 126 may be provided automatically as part of integration with neural network model training application 122.

In an operation 604, a neural network model description is read from neural network model description 126.

In an operation 606, a neural network model is instantiated with the neural network model description. For example, the architecture of the neural network model, its hyperparameters, its weight vector, and other characterizing elements are read and used to instantiate a neural network model based on the information output from the training process in operation 284.

In an operation 608, an observation vector is read from second dataset 524.

In an operation 610, the observation vector is input to the instantiated model.

In an operation 612, a predicted characteristic value for the read observation vector is received as an output of the instantiated model. The output may include a probability that the observation vector has one or more different possible characteristic values.

In an operation 614, the predicted characteristic value may be output, for example, by storing the predicted characteristic value with the observation vector to predicted dataset 526. In addition, or in the alternative, the predicted characteristic value may be presented on second display 516, printed on second printer 520, sent to another computing device using second communication interface 506, an alarm or other alert signal may be sounded through second speaker 518, etc.

In an operation 616, a determination is made concerning whether or not second dataset 524 includes another observation vector. When second dataset 524 includes another observation vector, processing continues in an operation 618. When second dataset 524 does not include another observation vector, processing continues in an operation 620.

In operation 618, a next observation vector is read from second dataset 524, and processing continues in operation 610.

In operation 620, processing stops and cleanup is performed as needed.

There are applications for neural network model training application 122 and prediction application 522 in many areas such as process control and equipment health monitoring, image processing and classification, data segmentation, data analysis, voice processing and recognition, language translation, etc. The presented results demonstrate improved significantly improved accuracies with fewer iterations resulting in significantly faster computing times to achieve comparable or better results. The explosion of digital data is generating many opportunities for big data analytics, which in turn provides many opportunities for training neural network models to capitalize on the information contained in the data—to make better predictions that lead to better decisions.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:
   (A) select a batch of observation vectors, wherein the batch of observation vectors includes a mini-batch size value number of observation vectors selected from a plurality of observation vectors, wherein each observation vector of the plurality of observation vectors includes a value for each variable of a plurality of variables;
   (B) execute a neural network to compute a post-iteration gradient vector and a current iteration weight vector using the selected batch of observation vectors, wherein the neural network includes a layer type for each layer of a plurality of neural network layers;
   (C) compute a search direction vector using a Hessian approximation matrix and the post-iteration gradient vector;
   (D) initialize a step size value with a predefined step size value;
   (E) compute an objective function value that indicates an error measure of the executed neural network given the current iteration weight vector, the step size value, and the computed search direction vector;
   (F) when the computed objective function value is greater than an upper bound value, update the step size value using a predefined backtracking factor value, wherein the upper bound value is computed as a sliding average of a predefined upper bound updating interval value number of previous upper bound values;
   (G) repeat (E) and (F) until the computed objective function value is not greater than the upper bound value;
   (H) compute an updated weight vector as a function of the current iteration weight vector, the updated step size value, and the computed search direction vector;
   (I) repeat (A) to (H) until a convergence parameter value indicates training of the neural network is complete, wherein the current iteration weight vector for a next iteration is the computed updated weight vector; and
   output the computed updated weight vector to describe a trained neural network model.

2. The non-transitory computer-readable medium of claim 1, wherein the upper bound value is computed using $$U_{k+1} = 0.1\left(\frac{1}{t_U}\sum_{i=1}^{t_U} U_{k-i}\right) + 0.9 U_0,$$

where $U_{k+1}$ is the upper bound value, $t_U$ is the predefined upper bound updating interval value, $U_{k-i}$ is a previous upper bound value for iteration k−i, k is an index to a current iteration, and $U_0$ is a predefined initial upper bound value.

3. The non-transitory computer-readable medium of claim 1, wherein the step size value is updated using $\alpha_k = \tau \alpha_k$, where $\alpha_k$ is the step size value, and $\tau$ is the predefined backtracking factor value.

4. The non-transitory computer-readable medium of claim 3, wherein the predefined backtracking factor value is between zero and one.

5. The non-transitory computer-readable medium of claim 3, wherein the predefined backtracking factor value is $\tau = \ln(2)$.

6. The non-transitory computer-readable medium of claim 1, wherein the predefined step size value is one.

7. The non-transitory computer-readable medium of claim 1, wherein, after (H) and before (I), the computer-readable instructions further cause the computing device to update the upper bound value when $\mod(k, t_U) = 0$, where mod indicates the modulus function, and $t_U$ is the predefined upper bound updating interval value.

8. The non-transitory computer-readable medium of claim 1, wherein the convergence parameter value is a number of iterations of (I).

9. The non-transitory computer-readable medium of claim 1, wherein the Hessian approximation matrix is computed using $g_k - g_{k-1}$, where $g_k$ is the post-iteration gradient vector of a current iteration of (B), and $g_{k-1}$ is the post-iteration gradient vector of a previous iteration of (B).

10. The non-transitory computer-readable medium of claim 1, wherein, after (I), the computer-readable instructions further cause the computing device to:

read a new observation vector from a dataset;
input the read new observation vector to the trained neural network model to predict a characteristic value of the read new observation vector; and
output the predicted characteristic value.

11. The non-transitory computer-readable medium of claim 1, wherein, before (A), the computer-readable instructions further cause the computing device to:
(J) select a second batch of observation vectors that includes the mini-batch size value number of observation vectors selected from the plurality of observation vectors;
(K) execute the neural network to compute an initial post-iteration gradient vector and the current iteration weight vector using the selected second batch of observation vectors and an initial weight vector;
(L) compute the search direction vector using an initial Hessian approximation matrix and the initial post-iteration gradient vector;
(M) initialize the step size value to the predefined step size value;
(N) compute the objective function value given the current iteration weight vector computed in (K), the step size value, and the search direction vector computed in (L);
(O) when the computed objective function value is greater than the upper bound value, update the step size value using the predefined backtracking factor value;
repeat (N) and (O) until the computed objective function value is not greater than the upper bound value; and
compute the updated weight vector as the function of the current iteration weight vector computed in (K), the updated step size value computed in (O), and the search direction vector computed in (L), wherein the current iteration weight vector in (B) is the computed updated weight vector.

12. The non-transitory computer-readable medium of claim 11, wherein, after (A) and before (B), the computer-readable instructions further cause the computing device to:
determine when it is time to compute a pre-iteration gradient vector based on a predefined gradient updating interval value; and
when it is time to compute the pre-iteration gradient vector, execute the neural network to compute the pre-iteration gradient vector using the selected batch of observation vectors and the current iteration weight vector,
wherein the Hessian approximation matrix in (C) is computed using $g_k - g_{k-1}$ when it is not time to compute the pre-iteration gradient vector, where $g_k$ is the post-iteration gradient vector of a current iteration of (B), and $g_{k-1}$ is the post-iteration gradient vector of a previous iteration of (B),
wherein the Hessian approximation matrix in (C) is computed using $g_k - \hat{g}_k$ when it is time to compute the pre-iteration gradient vector, where $\hat{g}_k$ is the pre-iteration gradient vector,
wherein the search direction vector in (C) is computed using $g_k$ when it is not time to compute the pre-iteration gradient vector,
wherein the search direction vector in (C) is computed using $\hat{g}_k$ when it is time to compute the pre-iteration gradient vector.

13. The non-transitory computer-readable medium of claim 12, wherein, computing the Hessian approximation matrix in (C) when it is time to compute the pre-iteration gradient vector comprises:

computing $s_{k+1} = \alpha_k p_k$, where $\alpha_k$ is the step size value, and $p_k$ is the search direction vector computed in (L); and
computing $y_{k+1} = g_k - \hat{g}_k$; and
computing the Hessian approximation matrix for a next iteration of (A) based on $s_{k+1}$ and $y_{k+1}$.

14. The non-transitory computer-readable medium of claim 12, wherein, computing the Hessian approximation matrix in (C) when it is not time to compute the pre-iteration gradient vector comprises:
computing $H_{k+1} = H_k$, where $H_{k+1}$ is the Hessian approximation matrix for a next iteration of (A), and $H_k$ is a current Hessian approximation matrix.

15. A computing device comprising:
a processor; and
a computer-readable medium operably coupled to the processor, the computer-readable medium having computer-readable instructions stored thereon that, when executed by the processor, cause the computing device to
(A) select a batch of observation vectors, wherein the batch of observation vectors includes a mini-batch size value number of observation vectors selected from a plurality of observation vectors, wherein each observation vector of the plurality of observation vectors includes a value for each variable of a plurality of variables;
(B) execute a neural network to compute a post-iteration gradient vector and a current iteration weight vector using the selected batch of observation vectors, wherein the neural network includes a layer type for each layer of a plurality of neural network layers;
(C) compute a search direction vector using a Hessian approximation matrix and the post-iteration gradient vector;
(D) initialize a step size value with a predefined step size value;
(E) compute an objective function value that indicates an error measure of the executed neural network given the current iteration weight vector, the step size value, and the computed search direction vector;
(F) when the computed objective function value is greater than an upper bound value, update the step size value using a predefined backtracking factor value, wherein the upper bound value is computed as a sliding average of a predefined upper bound updating interval value number of previous upper bound values;
(G) repeat (E) and (F) until the computed objective function value is not greater than the upper bound value;
(H) compute an updated weight vector as a function of the current iteration weight vector, the updated step size value, and the computed search direction vector;
(I) repeat (A) to (H) until a convergence parameter value indicates training of the neural network is complete, wherein the current iteration weight vector for a next iteration is the computed updated weight vector; and
output the computed updated weight vector to describe a trained neural network model.

16. The computing device of claim 15, wherein the upper bound value is computed using $$U_{k+1} = 0.1 \left( \frac{1}{t_U} \sum_{i=1}^{t_U} U_{k-i} \right) + 0.9 U_0,$$

where $U_{k+1}$ is the upper bound value, $t_U$ is the predefined upper bound updating interval value, $U_{k-i}$ is a previous upper bound value for iteration k–i, k is an index to a current iteration, and $U_0$ is a predefined initial upper bound value.

17. A method of training a neural network model, the method comprising:
(A) selecting, by a computing device, a batch of observation vectors, wherein the batch of observation vectors includes a mini-batch size value number of observation vectors selected from a plurality of observation vectors, wherein each observation vector of the plurality of observation vectors includes a value for each variable of a plurality of variables;
(B) executing, by the computing device, a neural network to compute a post-iteration gradient vector and a current iteration weight vector using the selected batch of observation vectors, wherein the neural network includes a layer type for each layer of a plurality of neural network layers;
(C) computing, by the computing device, a search direction vector using a Hessian approximation matrix and the post-iteration gradient vector;
(D) initializing, by the computing device, a step size value with a predefined step size value;
(E) computing, by the computing device, an objective function value that indicates an error measure of the executed neural network given the current iteration weight vector, the step size value, and the computed search direction vector;
(F) when the computed objective function value is greater than an upper bound value, updating, by the computing device, the step size value using a predefined backtracking factor value, wherein the upper bound value is computed as a sliding average of a predefined upper bound updating interval value number of previous upper bound values;
(G) repeating, by the computing device, (E) and (F) until the computed objective function value is not greater than the upper bound value;
(H) computing, by the computing device, an updated weight vector as a function of the current iteration weight vector, the updated step size value, and the computed search direction vector;
(I) repeating, by the computing device, (A) to (H) until a convergence parameter value indicates training of the neural network is complete, wherein the current iteration weight vector for a next iteration is the computed updated weight vector; and
outputting, by the computing device, the computed updated weight vector to describe a trained neural network model.

18. The method of claim 17, wherein the upper bound value is computed using $$U_{k+1} = 0.1\left(\frac{1}{t_U}\sum_{i=1}^{t_U} U_{k-i}\right) + 0.9 U_0,$$

where $U_{k+1}$ is the upper bound value, $t_U$ is the predefined upper bound updating interval value, $U_{k-i}$ is a previous upper bound value for iteration k–i, k is an index to a current iteration, and $U_0$ is a predefined initial upper bound value.

19. The method of claim 17, wherein the step size value is updated using $\alpha_k = \tau \alpha_k$, where $\alpha_k$ is the step size value, and $\tau$ is the predefined backtracking factor value.

20. The method of claim 19, wherein the predefined backtracking factor value is between zero and one.

21. The method of claim 19, wherein the predefined backtracking factor value is $\tau = \ln(2)$.

22. The method of claim 17, wherein the predefined step size value is one.

23. The method of claim 17, wherein, after (H) and before (I), further comprising updating, by the computing device, the upper bound value when $\mod(k, t_U) = 0$, where mod indicates the modulus function, and $t_U$ is the predefined upper bound updating interval value.

24. The method of claim 17, wherein the convergence parameter value is a number of iterations of (I).

25. The method of claim 17, wherein the Hessian approximation matrix is computed using $g_k - g_{k-1}$, where $g_k$ is the post-iteration gradient vector of a current iteration of (B), and $g_{k-1}$ is the post-iteration gradient vector of a previous iteration of (B).

26. The method of claim 17, wherein, after (I), further comprising:
reading, by the computing device, a new observation vector from a dataset;
inputting, by the computing device, the read new observation vector to the trained neural network model to predict a characteristic value of the read new observation vector; and
outputting, by the computing device, the predicted characteristic value.

27. The method of claim 17, wherein, before (A), further comprising:
(J) selecting, by the computing device, a second batch of observation vectors that includes the mini-batch size value number of observation vectors selected from the plurality of observation vectors;
(K) executing, by the computing device, the neural network to compute an initial post-iteration gradient vector and the current iteration weight vector using the selected second batch of observation vectors and an initial weight vector;
(L) computing, by the computing device, the search direction vector using an initial Hessian approximation matrix and the initial post-iteration gradient vector;
(M) initializing, by the computing device, the step size value to the predefined step size value;
(N) computing, by the computing device, the objective function value given the current iteration weight vector computed in (K), the step size value, and the search direction vector computed in (L);
(O) when the computed objective function value is greater than the upper bound value, updating, by the computing device, the step size value using the predefined backtracking factor value;
repeating, by the computing device, (N) and (O) until the computed objective function value is not greater than the upper bound value; and
computing, by the computing device, the updated weight vector as the function of the current iteration weight vector computed in (K), the updated step size value computed in (O), and the search direction vector computed in (L), wherein the current iteration weight vector in (B) is the computed updated weight vector.

28. The method of claim 27, wherein, after (A) and before (B), further comprising:
determining, by the computing device, when it is time to compute a pre-iteration gradient vector based on a predefined gradient updating interval value; and when it is time to compute the pre-iteration gradient vector, executing, by the computing device, the neural network to compute the pre-iteration gradient vector using the selected batch of observation vectors and the current iteration weight vector, wherein the Hessian approximation matrix in (C) is computed using $g_k - g_{k-1}$ when it is not time to compute the pre-iteration gradient vector, where $g_k$ is the post-iteration gradient vector of a current iteration of (B), and $g_{k-1}$ is the post-iteration gradient vector of a previous iteration of (B), wherein the Hessian approximation matrix in (C) is computed using $g_k - \hat{g}_k$ when it is time to compute the pre-iteration gradient vector, where $\hat{g}_k$ is the pre-iteration gradient vector, wherein the search direction vector in (C) is computed using $g_k$ when it is not time to compute the pre-iteration gradient vector, wherein the search direction vector in (C) is computed using $\hat{g}_k$ when it is time to compute the pre-iteration gradient vector.

29. The method of claim 28, wherein, computing the Hessian approximation matrix in (C) when it is time to compute the pre-iteration gradient vector comprises:

computing $s_{k+1} = \alpha_k p_k$, where $\alpha_k$ is the step size value, and $p_k$ is the search direction vector computed in (L); and computing $y_{k+1} = g_k - \hat{g}_k$; and computing the Hessian approximation matrix for a next iteration of (A) based on $s_{k+1}$ and $y_{k+1}$.

30. The method of claim 28, wherein, computing the Hessian approximation matrix in (C) when it is not time to compute the pre-iteration gradient vector comprises:

computing $H_{k+1} = H_k$, where $H_{k+1}$ is the Hessian approximation matrix for a next iteration of (A), and $H_k$ is a current Hessian approximation matrix.

* * * * *

UNITED STATES PATENT AND TRADEMARK OFFICE
CERTIFICATE OF CORRECTION

PATENT NO. : 10,769,528 B1  
APPLICATION NO. : 16/590544  
DATED : September 8, 2020  
INVENTOR(S) : Ben-hao Wang et al.

Page 1 of 1

It is certified that error appears in the above-identified patent and that said Letters Patent is hereby corrected as shown below:

In the Specification

Column 2, Lines 45-46:  
Delete the phrase "bias term $\beta \in \mathbb{R}_d$." and replace with --bias term $\beta \in \mathbb{R}^d$.--.

Column 2, Line 47:  
Delete the phrase "$a(x) \in \mathbb{R}_h$" and replace with --$\alpha(x) \in \mathbb{R}^h$--.

Column 2, Line 53:  
Delete the phrase "$\cup \{W_i, B_i\}_{i=1}^{l}$" and replace with --$\cup \{W_i, \beta_i\}_{i=1}^{l}$--.

Column 3, Line 19:  
Delete the phrase "$w_{k+1} = W_k - \eta_k \nabla' F_s(w_k)$" and replace with --$w_{k+1} = w_k - \eta_k \nabla F_s(w_k)$--.

Column 4, Line 22:  
Delete the phrase "$F(w_k + \alpha_k p_k) < F(w_k) + c\alpha_k p_k{}^T \nabla F(w_k)$" and replace with  
--$F(w_k + \alpha_k p_k) < F(w_k) + c\alpha_k p_k^T \nabla F(w_k)$--

Column 13, Line 57:  
Delete the phrase "$(s_{k-q+j}, y_{k-q+j})_{j=1}^{q}$" and replace with --$\left(s_{k-q+j}, y_{k-q+j}\right)_{j=1}^{q}$--.

Column 14, Lines 22-23:  
Delete the phrase "(for SGD, typically $D_{k+1} \cap D_k = 0$)." and replace with --(for SGD, typically $D_{k+1} \cap D_k = \emptyset$).--.

Signed and Sealed this  
Twenty-ninth Day of December, 2020

Andrei Iancu  
*Director of the United States Patent and Trademark Office*